United States Patent [19]

Dickson

[11] 4,214,174

[45] Jul. 22, 1980

[54] VOLTAGE MULTIPLIER EMPLOYING CLOCK GATED TRANSISTOR CHAIN

[75] Inventor: John F. Dickson, Long Buckby, England

[73] Assignee: Plessey Handel und Investments AG, Zug, Switzerland

[21] Appl. No.: 888,990

[22] Filed: Mar. 22, 1978

[30] Foreign Application Priority Data

Mar. 25, 1977 [GB] United Kingdom ............... 12716/77

[51] Int. Cl.² .................. G11C 11/40; H03K 7/02
[52] U.S. Cl. ........................ 307/229; 307/221 C; 328/160
[58] Field of Search ............... 307/221 C, 221 D, 229; 328/160

[56] References Cited

U.S. PATENT DOCUMENTS

| | | | |
|---|---|---|---|
| 3,666,972 | 5/1972 | Sanster | 307/221 C |
| 3,912,944 | 10/1975 | Mulder et al. | 307/221 D |
| 3,939,364 | 2/1976 | Adam et al. | 307/221 C |

Primary Examiner—John S. Heyman
Attorney, Agent, or Firm—Fleit & Jacobson

[57] ABSTRACT

A voltage multiplier circuit arrangement comprises a plurality of transistors connected a series between an input and an output of said arrangement, and first and second input lines arranged to have differential alternating voltage applied between them. Successive junctions between adjacent transistors are connected via respective capacitors to alternate ones of the first and second input lines. The control electrode (e.g. the gate or base electrode) of each one of said transistors is connected to a junction of two adjacent transistors, the latter being nearer to the output of said arrangement than is the one transistor. The junction is connected via one of the capacitors with the input line with which said one transistor is connected.

8 Claims, 4 Drawing Figures

VOLTAGE MULTIPLIER EMPLOYING CLOCK GATED TRANSISTOR CHAIN

This invention relates to circuit arrangements and relates more especially to voltage multiplier circuit arrangements.

In our co-pending patent application No. 719,975 now abandoned there is described a voltage multiplier circuit that is especially suitable for solid state construction and which offers advantages over other similar forms of voltage multiplier. In particular, in that application there is described a solid state voltage multiplier that lends itself to implementation using MOS or MNOS technologies and in which diode connected transistors are used in place of simple diodes. In equation (5) on page 8 of that application it is indicated that voltage multiplication occurs provided that:

$$\left(\frac{C}{C+C_S}\right) V_\phi - V_D - \frac{I_{OUT}}{(C+C_S)f} > 0 \quad (1)$$

where $V_\phi$ is the clock voltage and $V_D$ is the forward diode voltage.

In the case where diode connected transistors are used, $V_D$ becomes $V_T$, the transistor threshold voltage, so that equation (1) may be re-written:

$$\frac{C}{C+C_S} V_\phi - V_T - \frac{I_{OUT}}{(C+C_S)f} > 0 \quad (2)$$

Rearranging equation (2), it is found that voltage multiplication occurs providing:

$$V_\phi > \frac{C+C_S}{C} \left[ V_T + \frac{I_{OUT}}{(C+C_S)f} \right] \quad (3)$$

In fact, a more exact solution would take into account the increase in $V_T$ with source-substrate bias.

Nevertheless, from equation (3) it can be seen that for multiplication to occur $V_\phi > V_T$. Typically, the effective $V_T$ will be on the order of 5 volts and it is found that a clock voltage $V_\phi$ of approximately 7-8 volts is required. However, there are many applications where a maximum operating voltage of say 5 volts is required. In these applications the voltage multiplier that forms the basis of the aforesaid co-pending patent application No. 719,975 will not function.

It is an object of the present invention to provide a voltage multiplier circuit arrangement that is based on that described in the aforementioned patent application, and that incorporates transistors, but which will operate on lower voltages.

According to the present invention, there is provided a voltage multiplier circuit arrangement comprising a plurality of transistors connected in series between an input and an output of said arrangement, and first and second input lines arranged to have a differential alternating voltage applied between them, successive junctions between adjacent transistors being connected via capacitor means to alternate ones of the first and second input lines, the control electrode (e.g. the gate or base electrode) of each one of said transistors being connected to a junction of two adjacent transistors which are nearer to the output of said arrangement than is said one transistor, the junction beings connected via one of said capacitor means with the input line with which said one transistor is connected.

In carrying out the invention, the transistors may take the form of field effect transistors (e.g. of MOS or MNOS form) or may take the form of bipolar transistors.

In a preferred arrangement for carrying out the invention, the plurality of transistors will be terminated in diode means, preferably provided in the form of a diode connected transistor, the output of said iode means being connected via capacitor means to an appropriate one of the input lines and also connected to the control electrode of the last of the plurality of transistors.

Advantageously, further diode means will be provided connected to the last of the plurality of transistors for affording the output of said arrangement.

In one arrangement for carrying out the invention, the input of said arrangement may be connected to one or the other of the first and second input lines, and advantageously the first and second input lines may have applied to them a respective one of two anti-phase clock signals.

Some exemplary embodiments of the invention will now be described, reference being made to the accompanying drawings, in which.

Figure 1:
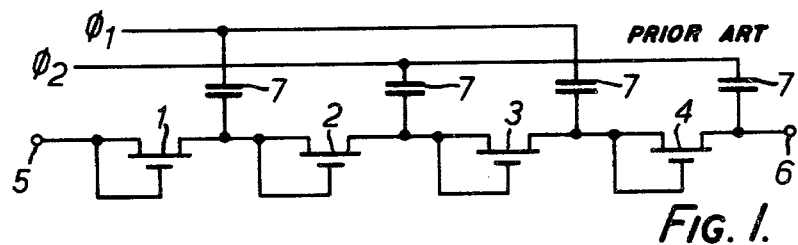
FIG. 1 is a circuit diagram of the voltage multiplier circuit arrangement that forms the basis of the aforementioned co-pending patent application No. 719,975 in which diode connected transistors are used.

In FIG. 1 of the drawings, there is depicted a voltage multiplier circuit of the form described in the aforementioned co-pending patent application No. 719,975 which makes use of diodes in the form of diode connected field effect transistors. The arrangement consists of four transistors 1, 2, 3 and 4, the gate and source electrodes of which are connected together so that they operate as diodes, the diode connected transistors 1, 2, 3 and 4 being connected in series between an input 5 and an output 6. Alternate junctions between adjacent ones of the transistors 1, 2, 3 and 4 are connected via capacitors 7 to one or the other of two anti-phase clock lines references $\phi 1$ and $\phi 2$. The operation of the multiplier circuit is fully described in the aforementioned application. As described therein, the input 5 may be a separate input as shown in FIG. 1 or may be connected to one of the clock lines $\phi 1$ or $\phi 2$. Since the transistors 1, 2, 3 and 4 are each connected in the form of a diode, the voltage drop across each of them will equal the threshold voltage $V_T$ and, as has already been shown, for multiplication to occur $V_T > V_\phi$ where $V_\phi$ is the clock voltage applied to the clock lines $\phi 1$ and $\phi 2$. Typically $V_T$ may be in the order of 5 volts, thus requiring a clock voltage $V_\phi$ of say 7 to 8 volts.

Figure 2:
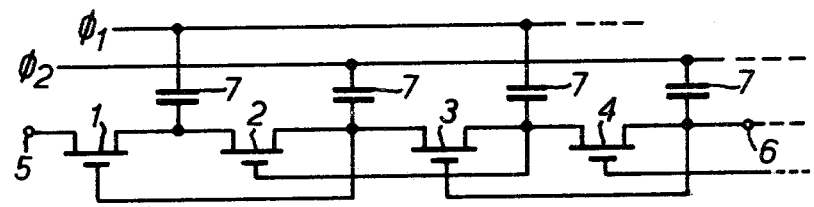
FIG. 2 is a circuit diagram of a voltage multiplier circuit arrangement in accordance with the present invention which makes use of field effect transistors.

In order to be able to reduce the clock voltage required so that the multiplier will operate on say 5 volts, it is necessary to reduce the effective voltage drop across the transistors 1, 2, 3 and 4, and this may be done by operating them as transistors rather than as diodes and by making use of the fact that there is a progressive increase in voltage between the input 5 and the output 6. Thus, it should be possible to connect the gate electrode of each of the transistors 1, 2, 3 and 4 to a point of higher voltage so that they are turned harder 'ON', thus reducing the voltage drop across them. An arrangement of this form is depicted in FIG. 2 of the accompanying drawing in which parts corresponding to those in FIG. 1 have been accorded the same reference numerals. In this circuit, instead of connecting the transistors 1, 2, 3 and 4 as diodes, they are connected as transistors, the gate electrode of each of which is connected to the junction between two adjacent ones of the transistors, which junction is nearer the output 5, and the gate electrode is thus at a higher potential than the corresponding source electrode, thus causing the transistor to be turned harder 'ON'. However, the junctions between adjacent ones of the transistors 1, 2, 3 and 4 are associated with alternate ones of the clock lines $\phi 1$ and $\phi 2$ so that a phase difference occurs between adjacent junctions. Because of this, it is necessary to connect the gate electrode of one transistor to the junction between two transistors associated with the same clock voltage. Thus, it is found that the gate electrode of one transistor is connected to the next but one junction between two transistors as shown in the circuit of FIG. 2, although in theory it would be possible to connect it to the next-but-three or next-but five junction etc. Thus, in the circuit of FIG. 2, the gate electrode of transistor 1 is connected to the junction of transistor 2 and 3; the gate electrode of transistor 2 is connected to the junction between transistors 3 and 4, etc.

With such an arrangement as described with reference to FIG. 2, it is found that the circuit is self-limiting in that, regardless of increasing clock voltage, the effective voltage drop across each of the transistors 1, 2, 3 and 4 will be equal to half the threshold voltage, i.e., $V_T/2$. If a next-but-three junction arrangement is used, then the effective voltage drop across each transistor will be equal to $V_T/4$, and so on for the other possible connections.

Thus, for the multiplier circuit of FIG. 2, it can be shown that voltage multiplication will occur if $V_\phi > V_T/2$ and typically a clock voltage of approximately 4 to 5 volts is found satisfactory.

One problem with the multiplier circuit of FIG. 2 is that it needs to be terminated so that the gate electrode of the final transistor 4 of the transistors 1, 2, 3 and 4 can be correctly connected. This may be done as shown in FIG. 3 by making use of a further transistor 8 connected in series with the transistors 1, 2, 3 and 4 and connected to the appropriate clock line via a capacitor 7, but by connecting the gate and source electrodes of the transistor 8 together so that it operates as a diode.

The gate electrode of the final transistor 4 of the transistors 1, 2, 3 and 4 is then connected to the drain electrode of the transistor 8 which is also connected to the $\phi 1$ clock line via a capacitor 7. An output from the circuit of FIG. 3 may be derived from the drain electrode of the transistor 8, but more preferably is derived from the junction of the transistors 4 and 8 via a further transistor 9, the source and gate electrodes of which are connected together so that it operates as a diode to afford the output 6.

Figure 3:
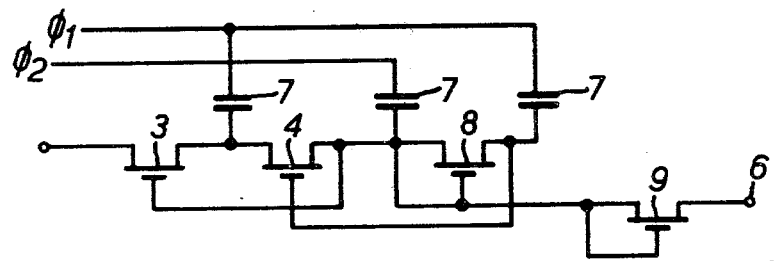
FIG. 3 is a circuit diagram of a termination circuit for the voltage multiplier circuit arrangement of FIG. 2.
Figure 4:
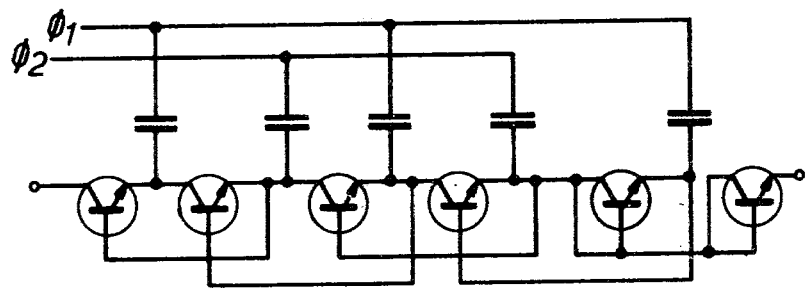
FIG. 4 is a circuit diagram of a voltage multiplier circuit arrangement in accordance with the present invention which is similar to that shown in FIGS. 2 and 3 but which makes use of bipolar transistors.

The voltage multiplier circuit arrangement so far considered with reference to FIGS. 2 and 3 of the accompanying drawings has been described as incorporating field effect transistors and may be advantageously constructed in solid state form using, for example, metal oxide silicon (MOS) or metal nitride oxide silicon (MNOS) technology,. However the arrangement of FIGS. 2 and 3 may equally well be implemented using bipolar technology, and a circuit arrangement of that form is shown in FIG. 4 of the accompanying drawing. The parts of the arrangement of FIG. 4 that correspond to those in FIGS. 2 and 3 have been accorded the same reference numerals and, since it operates in exactly the same way as described for FIGS. 2 and 3, no further explanation is deemed necessary apart from saying that the voltage drop across each of the series connected transistors, except for transistors 8 and 9, is $V_{BE}/2$, where $V_{BE}$ is the usual base-emitter voltage. In this case, voltage multiplication will occur if $V_\phi > V_{BE}/2$ One particularly envisaged application of the voltage multiplier circuit arrangement described with reference to FIG. 2 with the terminating circuit of FIG. 3 is in repertory diallers which are preferably constructed in MNOS form and are required to operate from a normal line voltage of approximately 5v.

It is obvious that the embodiments of the present invention described hereinabove are merely illustrative and that other modifications and adaptations thereof may be made without departing from the scope of the appended claims.

What we claim is:

1. A voltage multiplier circuit arrangement, comprising a plurality of transistors having respective main electrodes cascade connected in a series, each transistor having a control electrode connected to a respective junction formed by the main electrodes of two further transistors in said series, said two further transistors being connected adjacent to and toward the output side of said each transistor, said arrangement further comprising first and second input lines arranged to have an alternating voltage applied between them, capacitor means for connecting each said junction to one of the first and second input lines, junctions which are immediately adjacent to one another in the series being respectively connected to different ones of the first and second input lines.

2. The circuit arrangement as recited in claim 1, wherein the transistors comprise field effect transistors.

3. The circuit arrangement as recited in claim 1, wherein the transistors comprise bi-polar transistors.

4. The circuit arrangement as recited in claim 1, comprising diode means for terminating the plurality of transistors.

5. The circuit arrangement as recited in claim 4, wherein the diode means comprises a diode connected transistor, said arrangement comprising capacitor means for connecting said diode connected transistor to a corresponding one of the input lines, said diode connected transistor being also connected to the control electrode of the last transistor of the plurality of transistors.

6. The circuit arrangement as recited in claims 4 or 5, comprising further diode means connected to the last transistor of the plurality of transistors for providing the output of said arrangement.

7. The circuit arrangement as recited in claims 1, 2, 3, 4 or 5, wherein the input of said arrangement is connected to one of the first and second input lines.

8. The circuit arrangement as recited in claims 1, 2, 3, 4 or 5, wherein two antiphase clock signals are respectively provided to the first and second input lines.

* * * * *